United States Patent
Harris (10) Patent No.: US 10,605,281 B2
(45) Date of Patent: Mar. 31, 2020

(54) COMPONENT RETENTION ASSEMBLY

(71) Applicant: DENSO International America, Inc., Southfield, MI (US)

(72) Inventor: Justin Harris, Royal Oak, MI (US)

(73) Assignee: DENSO International Business Machines Corporation, Southfield, MI (US)

(*) Notice: Subject to any disclaimer, the term of this patent is extended or adjusted under 35 U.S.C. 154(b) by 48 days.

(21) Appl. No.: 16/100,623

(22) Filed: Aug. 10, 2018

(65) Prior Publication Data
US 2020/0049178 A1    Feb. 13, 2020

(51) Int. Cl.
*F28D 1/00* (2006.01)
*F16B 2/24* (2006.01)
*B60R 13/02* (2006.01)
*F16B 5/12* (2006.01)

(52) U.S. Cl.
CPC .......... *F16B 2/245* (2013.01); *B60R 13/0206* (2013.01); *F16B 5/126* (2013.01); *F28F 2275/085* (2013.01)

(58) Field of Classification Search
CPC ...... F16B 2/245; F16B 5/126; B60R 13/0206; F28F 2275/085
USPC ........................................................ 165/149
See application file for complete search history.

(56) References Cited

U.S. PATENT DOCUMENTS

| | | | | |
|---|---|---|---|---|
| 2,654,131 A | * | 10/1953 | Poupitch | E06B 3/60 16/220 |
| 2,733,049 A | * | 1/1956 | Carter | F24D 19/04 165/55 |
| 3,314,177 A | * | 4/1967 | Mies, Jr. et al. | B42F 17/08 40/124 |
| 3,520,031 A | * | 7/1970 | Nelson | F16B 5/128 24/292 |
| 4,047,353 A | * | 9/1977 | Aarons | E04D 1/3402 52/713 |
| 4,253,585 A | * | 3/1981 | Janisiewicz | B23P 19/004 221/242 |
| 4,856,746 A | * | 8/1989 | Wrobel | A47B 96/063 248/250 |
| 5,205,349 A | * | 4/1993 | Nagao | B60H 1/00328 165/153 |
| 5,570,737 A | * | 11/1996 | Tokutake | F28D 1/0535 165/67 |
| 5,697,431 A | * | 12/1997 | Nagasaka | F28F 9/002 165/149 |
| 5,996,684 A | * | 12/1999 | Clifton | B60H 1/3229 165/121 |
| 6,315,034 B1 | * | 11/2001 | Mahe | F04D 29/582 165/121 |

(Continued)

*Primary Examiner* — Claire E Rojohn, III
(74) *Attorney, Agent, or Firm* — Harness, Dickey & Pierce, P.L.C.

(57) ABSTRACT

A component retention assembly is fixed to an associated part and configured to be engaged with a bracket of a component. The component retention assembly may include a pair of cantilever prongs and a clip. The clip includes a hinge and an extension that is removably disposed between the pair of cantilever prongs when the clip is in a closed position. A prong is disposed on an end of the extension opposite the hinge. The prong includes a retaining face configured to engage the bracket and retain the clip in the closed position.

19 Claims, 3 Drawing Sheets

(56) References Cited

U.S. PATENT DOCUMENTS

| | | | | |
|---|---|---|---|---|
| 6,318,450 B1* | 11/2001 | Acre | ............... | F28D 1/0435 165/121 |
| 6,481,682 B2* | 11/2002 | Miura | ............... | F16B 5/0635 24/297 |
| 6,901,992 B2* | 6/2005 | Kent | ............... | F28F 9/002 165/67 |
| 7,117,927 B2* | 10/2006 | Kent | ............... | F28F 9/002 165/67 |
| 7,575,211 B2* | 8/2009 | Andritter | ............... | F01P 11/08 180/68.4 |
| 7,703,730 B2* | 4/2010 | Best, Jr. | ............... | F01P 3/18 165/41 |
| 7,882,913 B2* | 2/2011 | Maeda | ............... | B60K 11/04 180/68.4 |
| 8,919,856 B2* | 12/2014 | Sia, Jr. | ............... | B60J 1/2047 296/152 |
| 9,146,061 B2* | 9/2015 | Farlow | ............... | F28F 9/002 |
| 9,451,821 B1* | 9/2016 | Estigoy | ............... | A45F 5/021 |
| 9,822,668 B2* | 11/2017 | Duguay | ............... | F01D 25/246 |
| 10,234,215 B2* | 3/2019 | Rong | ............... | F28F 9/007 |
| 2002/0037389 A1* | 3/2002 | Miyano | ............... | B29C 45/4407 428/99 |
| 2002/0130237 A1* | 9/2002 | Kluser | ............... | F16B 5/0685 248/316.1 |
| 2002/0194710 A1* | 12/2002 | Dickinson | ............... | F16B 5/0614 24/295 |
| 2006/0168773 A1* | 8/2006 | Smith | ............... | B60R 13/0206 24/295 |
| 2006/0237175 A1* | 10/2006 | Hara | ............... | F04D 29/582 165/140 |
| 2007/0089855 A1* | 4/2007 | Heine | ............... | F28D 1/0435 165/67 |
| 2008/0260488 A1* | 10/2008 | Scroggie | ............... | B62D 29/048 411/45 |
| 2011/0296578 A1* | 12/2011 | Lee | ............... | A41D 13/04 2/48 |
| 2012/0037350 A1 | 2/2012 | Kim et al. | | |
| 2012/0159749 A1* | 6/2012 | Itou | ............... | H02G 3/26 24/457 |
| 2012/0204386 A1* | 8/2012 | Kipker | ............... | F16B 2/245 24/457 |
| 2015/0076304 A1* | 3/2015 | Hattori | ............... | F16B 21/075 248/231.81 |
| 2015/0159778 A1* | 6/2015 | Kuhm | ............... | B60R 16/0215 248/74.2 |
| 2015/0342330 A1* | 12/2015 | Tom | ............... | A45F 5/021 24/3.1 |
| 2015/0362215 A1* | 12/2015 | Lesage | ............... | F24H 9/2021 248/213.2 |
| 2016/0039268 A1* | 2/2016 | Gosioco | ............... | B60H 1/00528 454/152 |
| 2017/0002974 A1* | 1/2017 | Will | ............... | A47G 1/16 |
| 2017/0302220 A1* | 10/2017 | Martin | ............... | F16B 2/005 |
| 2019/0219345 A1* | 7/2019 | Wilson | ............... | F28D 1/05366 |
| 2019/0271339 A1* | 9/2019 | Benedetti | ............... | B60R 13/00 |

* cited by examiner

COMPONENT RETENTION ASSEMBLY

FIELD

The present disclosure relates to a component retention assembly, and more specifically, an anti-pull-off feature for a cantilever snap-fit retention assembly.

BACKGROUND

This section provides background information related to the present disclosure which is not necessarily prior art.

Various components are often secured to associated parts in the vehicle or engine compartment. For example, an engine coolant module component (such as a fan, condenser, oil cooler, etc.) may be mounted on a radiator. In smaller vehicles, the component may be mounted using a cantilever snap-fit. However, in larger vehicles, such as trucks and sports-utility vehicles (SUVs), because of the vibration loads, the component is mounted using bolts, nuts, and washers. The traditional cantilever snap-fit has an increased risk of failing in the larger vehicles with higher vibration loads: either the component disengaging or the snap-fit breaking off. However, the bolts, nuts, and washers are more expensive and increase labor time compared to the cantilever snap-fit.

SUMMARY

This section provides a general summary of the disclosure, and is not a comprehensive disclosure of its full scope or all of its features.

An example component retention assembly according to the present disclosure is fixed to an associated part and configured to be engaged with a bracket of a component. The component retention assembly may include a pair of cantilever prongs and a clip. The clip includes a hinge and an extension that is removably disposed between the pair of cantilever prongs when the clip is in a closed position. A prong is disposed on an end of the extension opposite the hinge. The prong includes a retaining face configured to engage the bracket and retain the clip in the closed position.

Each cantilever prong of the pair of cantilever prongs may further include a ramp on a free end of the cantilever prong.

The prong may further include a ramp on a free end of the prong.

The prong may be triangularly shaped.

The clip may further include a base fixed to an end of the hinge opposite the extension.

The clip may rotate about the hinge between an open position and the closed position. The open position may be about 180 degrees or greater relative to the base and the closed position may be about 90 degrees relative to the base.

An example component assembly according to the present disclosure may include a part, a component, and a retention assembly. The component may be configured to be fixed to the part. The retention assembly may be fixed to the part and may engage a bracket on the component to secure the component to the part. The retention assembly may further include a pair of cantilever prongs and a clip. The clip may rotate about a hinge between an open position and a closed position. An extension on the clip may be disposed between the pair of cantilever prongs when the clip is in a closed position. A prong on the clip may be disposed on an end of the extension opposite the hinge. The prong may include a retaining face configured to engage the bracket and retain the clip in the closed position.

Each cantilever prong of the pair of cantilever prongs may include a ramp on a free end of the cantilever prong.

Each cantilever prong of the pair of cantilever prongs may include a surface opposite the ramp that engages a front surface of the bracket.

The prong may include a ramp on a free end of the prong.

The prong may include a retaining surface on an opposite end of the ramp that engages a rear surface of the bracket.

The prong may be triangularly shaped.

The clip may include a base fixed to an end of the hinge opposite the extension.

When the clip is in the open position, an angle between the extension and the base may be about 180 degrees or greater and when the clip is in the closed position, the angle between the extension and the base may be about 90 degrees.

The extension may include at least one nub extending from a top surface, a bottom surface, or the top surface and the bottom surface.

The at least one nub may engage a side of one cantilever prong of the pair of cantilever prongs.

The retention assembly may be formed of a polymer.

The retention assembly may be a single, monolithic part.

The retention assembly and the part may be a single, monolithic part.

The retention assembly may be injection molded.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Traditional cantilever snap-fits are common in the automotive industry for assembly mating components such as fans to radiators, but are typically only used on smaller cars, not trucks or SUVs because the vibration load is smaller, causing less risk of the components disengaging from the snap fit or the snap fit breaking off. Sometimes, the cantilever snap fit design includes a 90-degree locking angle which could potentially disengage during vibration because of the repeated load pushing the feature down. Also, if the snap fit is loaded in a heated environment, creep can occur, making disengagement more likely.

The component retention assembly of the present disclosure includes a living hinge and a single cantilever snap which prevents components from disengaging during vibration. The component retention assembly may be mounted on, for example, a radiator tank to retain, for example, an engine coolant module component on the radiator tank. Because of its unique design which is capable of handling higher vibration loads, the component retention assembly of the present disclosure can be used in larger trucks and SUVs, where the traditional cantilever snap fits cannot be used.

Referring to FIGS. 1-5, a component retention assembly 10 is illustrated. The component retention assembly 10 may include a pair of cantilever prongs 14 and a clip 18. The cantilever prongs 14 and clip 18 may work together to retain and secure a component 22 to an associated part 26.

For example, the component 22 may be an engine coolant module (ECM) component, such as a fan, condenser, oil cooler, etc. The component 22 may include a bracket 30 that engages the component retention assembly 10, as further described below. The bracket 30 may be the portion of the component 22 that secures the component 22 to the associated part 26.

For example, the associated part 26 may be a radiator tank 34. The radiator tank 34 may be formed of a glass-filled polyamide (such as nylon), another polymer or ceramic or combination thereof.

The pair of cantilever prongs 14 may be irremovably fixed to the associated part 26, such as, for example, by an adhesive, or may be integral with the associated part 26. For example, the pair of cantilever prongs 14 and the associated part 26 may be injection molded together to create a single, monolithic, part. The pair of cantilever prongs 14 may also be formed of the same material as the associated part 26, such as a polyethylene or other polymer or plastic.

The pair of cantilever prongs 14 may be projections extending from the associated part 26. Each of the pair of cantilever prongs 14 may include a beam, or straight portion, 38 and a prong, or an offset end portion, 42. The beam 38 may be fixed to, or engaged with, the associated part 26 on a first, or proximal, end 46 and may be fixed to, or engaged with, the prong 42 on a second, or distal, end 50, opposite the first end 46. The prong 42 may be fixed to, or engaged with, the beam 38 on a first, or proximal, end 54 which is opposite a free, second, or distal, end 58.

The prong 42 may be offset from the beam 38, such that the second end 50 of the beam 38 connects with the prong 42 on a bottom surface 62 rather than a side surface 66 at the first end 54 of the prong 42. When installed, the side surface 66 of the prong 42 acts as an anti-pull-off feature, or retention feature, engaging with a surface, or face, 70 of the bracket 30 of the component 22 and preventing the component 22 from disengaging with the prong 42. The prong 42 may have a height H large enough to resist pulling out of the bracket 30. For example, the height H may vary based on application, but in some applications, the height H may be within a range of 1-2 millimeters (mm).

The free end 58 of the prong 42 may include a ramp 74 on a top surface 78 to assist in guiding the prong 42 in a first aperture 82 of the bracket 30. For example, the angle of the ramp 74 may vary based on application, but in some applications the ramp 74 may extend at an angle between approximately 20 degrees and 45 degrees (±5 degrees on each end) to guide the prong 42 in the first aperture 82.

The pair of cantilever prongs 14 may be positioned as mirror images of one another, with the ramps 74 and the side surfaces 66 of the pair of cantilever prongs 14 being on opposite sides. This configuration allows the pair of cantilever prongs 14 to be compressed together, inserted within the first aperture 82, and expanded to engage a top wall 86 and a bottom wall 90 of the first aperture 82. When the pair of cantilever prongs 14 engage the top wall 86 and the bottom wall 90, the side surfaces 66 engage the surface 70 of the bracket 30.

At least one pair of retainers 94 may also be irremovably fixed, or integral with, the associated part 26. In some embodiments, a pair of retainers 94 may be associated with each of the pair of cantilever prongs 14. Each of the pair of retainers 94 is positioned outside of, and on opposing sides of, each of the pair of cantilever prongs 14. The pair of retainers 94 may be irremovably fixed to the associated part 26, such as, for example, by an adhesive, or may be integral with the associated part 26. For example, the pair of retainers 94 and the associated part 26 may be injection molded together to create a single, monolithic, part. The pair of retainers 94 may also be formed of the same material as the associated part 26, such as a polyethylene or other polymer or plastic.

Each of the pair of retainers 94 may be a straight beam 98 having a free end 102. The free end 102 may be rounded, squared-off, or any other shape. When the bracket is fixed on the component retention assembly 10, the free end 102 may contact a rear surface, or face, 106 of the bracket 30 to position the front surface 70 of the bracket 30 against the side 66 of the prong 42.

In use, vibration of the component 22 creates a force on the side 66 of the prong 42 which creates a bending moment pushing the prong 42 in a direction disengaging the side 66 from the front surface 70 and pushing the prongs 42 of the pair of cantilever prongs 14 together. For example only, vibration may create a bending moment between 1 and 2 Newton-meters (Nm) on the prong 42. If the force is too high (for example only, over 500 Newtons (N), the prong 42 can deflect enough to disengage the pair of cantilever prongs 14 from the bracket 30, resulting in a failure. Even when the force is low (for example only, about 30 N), the component 22, pair of cantilever prongs 14, and/or bracket 30 may be subject to heat, resulting in creep of the pair of cantilever prongs 14. Over time (for example only, 2000 hours or more, or 60,000 miles or more in a vehicle application), the low force could create a deflection in the pair of cantilever prongs 14 that is high enough for the parts to disengage from the bracket 30.

The clip 18, however, retains the pair of cantilever prongs 14 in place on the bracket 30, resisting the effects of vibration and creep. The clip 18 may include a base 110, a living hinge 114, an extension 118, and a snap fit prong 122. The base 110, living hinge 114, extension 118, and snap fit prong 122 may be a single, monolithic part. The clip 18 may be irremovably fixed, or integral with, the associated part 26, such as, for example, by an adhesive, or may be integral with the associated part 26. For example, the clip 18 and the associated part 26 may be injection molded together to create a single, monolithic, part. The clip 18 may also be formed of the same material as the associated part 26, such as a polyethylene or other polymer or plastic.

The base 110 may be a single beam having a square, rectangular, circular, or other-shaped cross section and may extend from the associated part 26 on a first, or proximal, end, 126. The base 110 may extend a length approximately equal to a length of the beam 38, such that the base 110 extends a distance to the rear surface 106 of the bracket 30. The base 110 may be fixed to the living hinge 114 on a second, or distal, end 130, opposite the first end 126.

The living hinge 114 may be fixed to the base 110 on a first, or proximal, end 134 and may be fixed to the extension 118 on a second, or distal end 138, opposite the first end 134. The living hinge 114 may be a C-shaped, or curved hinge. With the C-shaped portion extending from the first end 134 to the second end 138. A distance D from the first end 134 to the second end 138 across a gap between the first end 134 and the second end 138 may be approximately equal to a width W of the bracket 30.

The living hinge 114 is a flexible hinge, or flexure bearing, that forms a bridge between the base 110 and extension 118 and allows the extension 118 to pivot, or rotate, relative to the base 110. The living hinge 114 may be designed to allow multiple bends and may include a pre-yield strain. The living hinge 114 may further act as a butterfly-type hinge or a spring that pulls the extension 118 and snap fit prong 122 closed (i.e., toward the bracket 30).

The extension 118 may be fixed to the living hinge 114 on a first, or proximal, end 142 and may be fixed to the snap fit prong 122 on a second, or distal, end 146 opposite the first end 142. The extension 118 may be a single beam having a square, rectangular, or other-shaped cross section that has a flat side 150 facing the front surface 70 of the bracket 30. The extension 118 may extend a length EL from the living hinge 114, across the prongs 42 of the pair of cantilever prongs 14, and to a second aperture, or divot, 154 in the bracket 30. For example only, the length EL may vary based on the application, but in some applications the length EL may be approximately 30 mm.

The snap fit prong 122 may be fixed to the extension 118 on a first, or proximal, end 158 and may have a free, second, or distal, end 162. The snap fit prong 122 may extend at an angle orthogonal, or approximately orthogonal, to the extension 118. The free end 162 of the snap fit prong 122 may be triangularly shaped and include a ramp 166 and a retaining face 170. The ramp 166 may be angled to assist in guiding the snap fit prong 122 into the second aperture 154 of the bracket 30. For example, the angle of the ramp 166 may vary based on application, but in some applications the ramp 166 may extend at an angle between approximately 20 degrees and 45 degrees (±5 degrees on each end) to guide the snap fit prong 122 in the second aperture 154.

The retaining face 170 acts as an anti-pull-off feature, or retention feature, engaging with the rear surface 106 of the bracket 30 of the component 22 and preventing the snap fit prong 122 from disengaging from the bracket 30. The retaining face 170 may have a height RH large enough to resist pulling out of the bracket 30. For example, the height RH may vary based on the application, but in some applications the height RH may be within a range of 0.5 mm to 1 mm.

When the clip 18 is closed (or secured), the extension 118 fits between the pair of cantilever prongs 14. The extension 118 prevents the pair of cantilever prongs 14 from deflecting together during vibration or creep. The extension 118 further prevents the pair of cantilever prongs 14 from rattling during vibration.

In some embodiments, crush ribs 174 may be formed on a top surface 178 and a bottom surface 182 of the extension 118. The crush ribs 174 may be squared or curved projections or nubs formed on the respective surface and engaging with opposing side surfaces of each of the pair of cantilever prongs 14. For example only, the crush ribs 174 may vary based on the application, but in some applications the crush ribs 174 may each extend within a range of 0.5 mm to 2 mm from the respective surface of the extension 118. The crush ribs 174 may provide a better fit between the extension 118 and the pair of cantilever prongs 14, further reducing noise from vibration or rattling.

Figure 1:
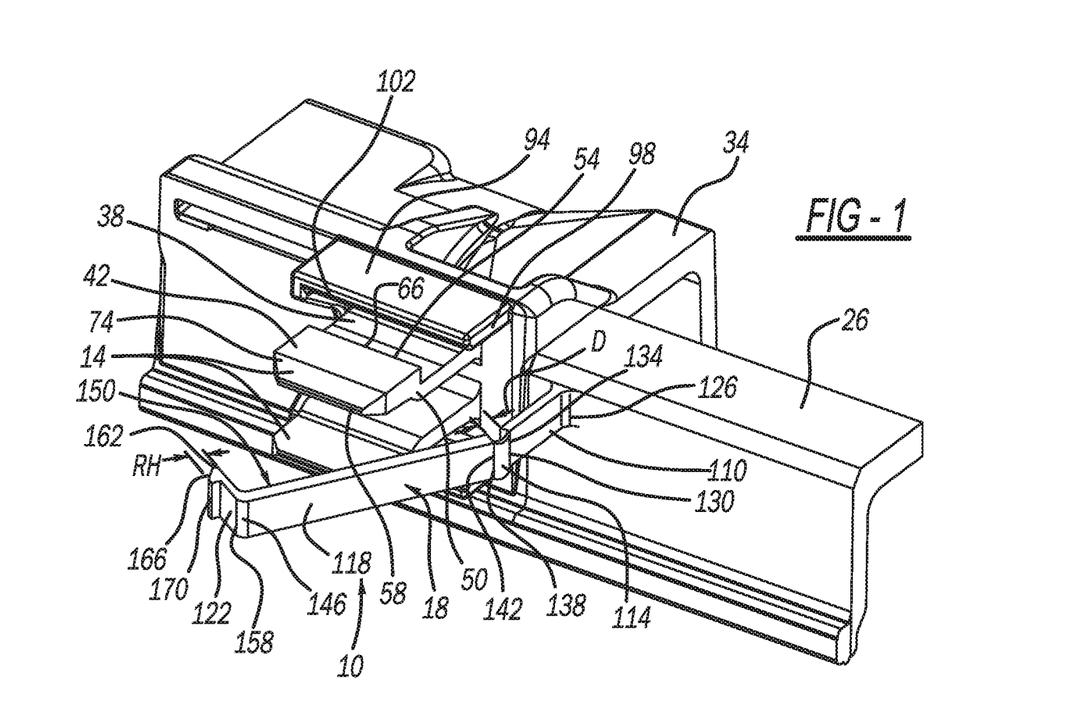
FIG. 1 is a perspective view of an example embodiment of a component retention assembly on an associated part according to the present disclosure.
Figure 2:
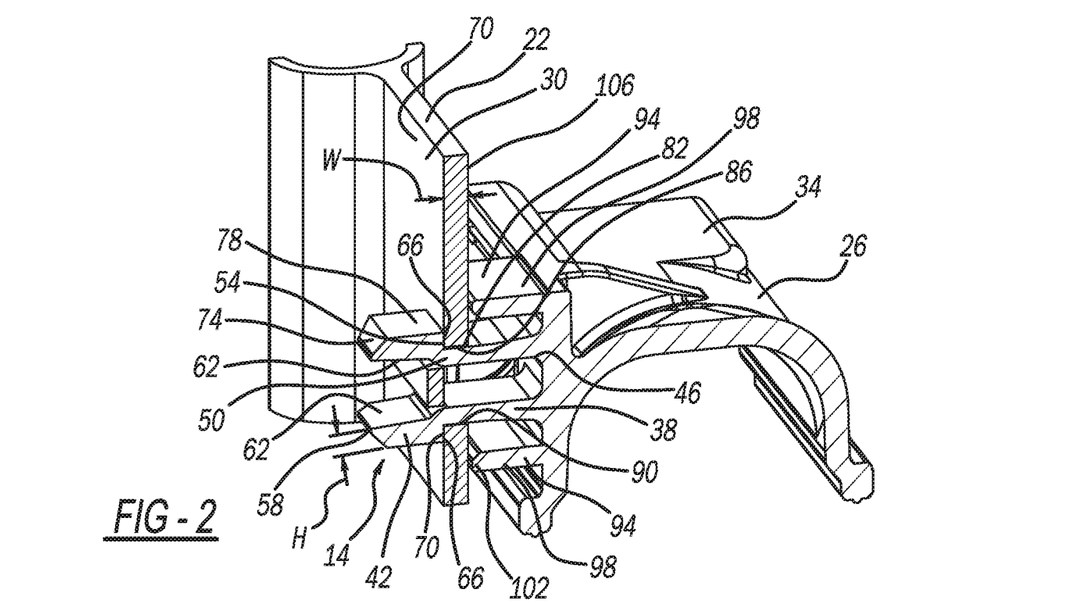
FIG. 2 is a cross sectional view of the component retention assembly on the associated part of FIG. 1.
Figure 3:
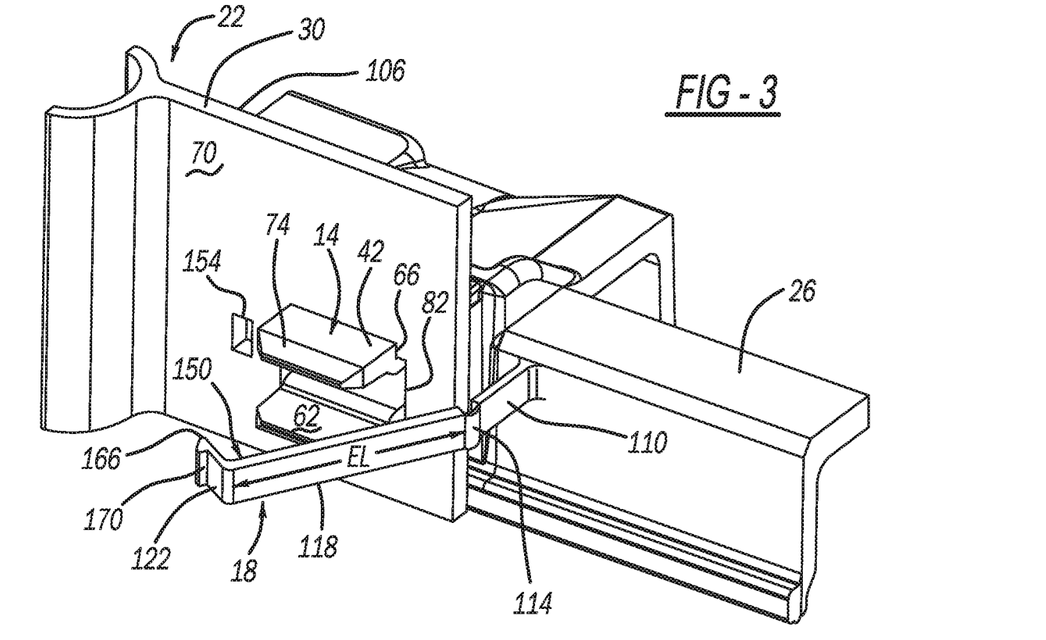
FIG. 3 is a perspective view of the component retention assembly of FIG. 1 engaged with a bracket of a component according to the present disclosure.
Figure 4:
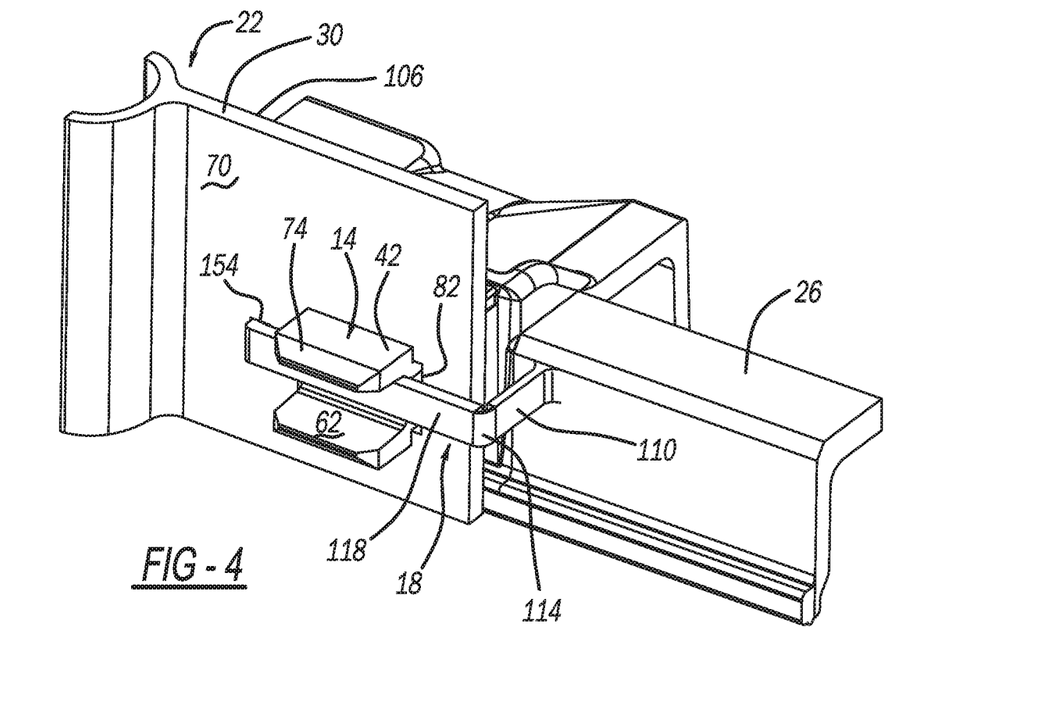
FIG. 4 is another perspective view of the component retention assembly of FIG. 1 engaged with the bracket in FIG. 3.
Figure 5:
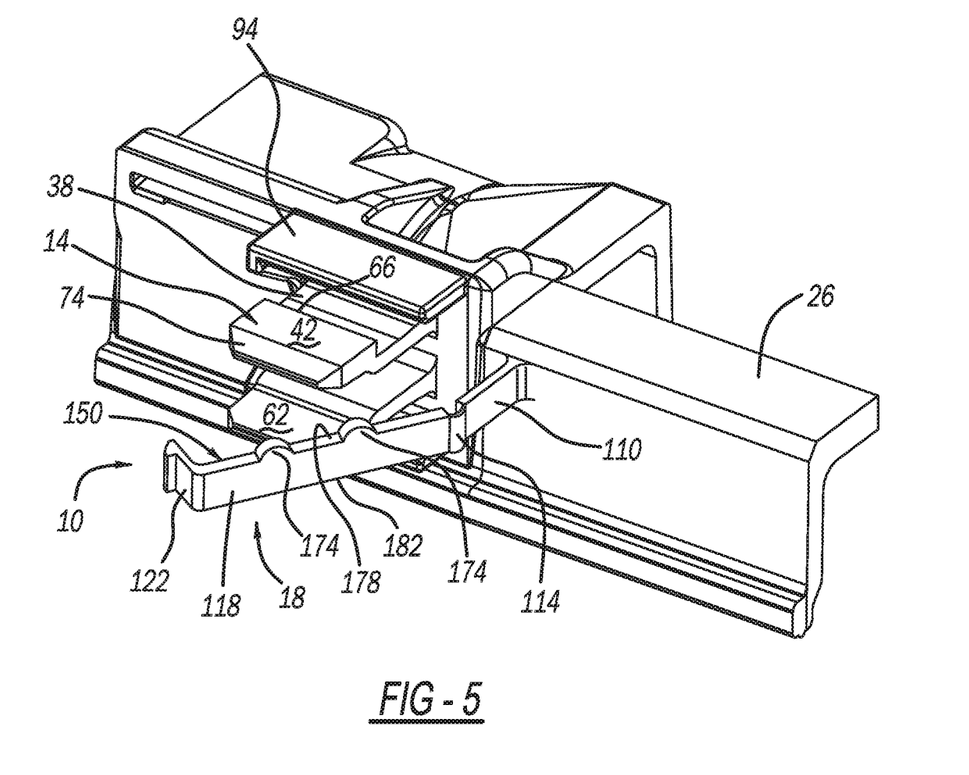
FIG. 5 is a perspective view of another example embodiment of a component retention assembly on an associated part and engaged with a bracket of a component according to the present disclosure.

Referring to FIGS. 3 and 4, assembly of the component retention assembly 10 is illustrated. The component retention assembly 10 may reduce part cost, assembly/labor cost, and assembly time when compared with traditional nut, washer, and bolt fastening methods. To assemble, the bracket 30 of the component 22 is brought towards the associated part 26. The first aperture 82 is aligned with the pair of cantilever prongs 14 and the first aperture 82 is brought into contact with the ramps 74 of the prongs 42. As the bracket 30 is pushed onto the ramps 74 of the pair of cantilever prongs 14, the pair of cantilever prongs 14 are compressed together. The bracket 30 is moved toward the associated part 26 until it surpasses the surface 66 of the prongs 42 and the pair of cantilever prongs 14 expand, reverting back to the original shape.

The bracket 30 is disposed in a space between the sides 66 of the prongs 42 and the ends 102 of each pair of retainers 94. The sides 66 and the ends 102 may cooperate to retain the bracket 30 therebetween. The sides 66 engage with the front surface 70 of the bracket 30, and the ends 102 engage with the rear surface 106 of the bracket 30.

The extension 118 of the clip 18 is pivoted at the hinge 114 from an open position where the snap fit prong 122 is not engaged with the bracket 30 to a closed position where the snap fit prong 122 is engaged with the second aperture 154 in the bracket 30. For example only, an angle between the base 110 and the extension 118 may be equal to or greater than approximately 180 degrees (±5 degrees) when the clip 18 is in the open position, the angle between the base 110 and the extension 118 may be approximately 90 degrees (±5 degrees) when the clip 18 is in the closed position, and the angle between the base 110 and the extension 118 may be between approximately 90 degrees and 180 degrees (±5 degrees on each end) when the clip 18 is transitioning between the open position and the closed position.

As the clip 18 reaches the closed position, the snap fit prong 122 moves toward engagement with the bracket 30. Specifically, the ramp 166 comes into engagement with the second aperture 154 in the bracket 30. As the snap fit prong 122 is inserted into the second aperture 154, the snap fit prong 122 is flexed toward the extension 118 until the bracket 30 surpasses the retaining face 170 of the snap fit prong 122 and the snap fit prong 122 retracts, reverting back to the original shape. The retaining face 170 contacts the rear surface 106 of the bracket 30 to retain the snap fit prong 122 in the second aperture 154.

As the clip 18 is closed and the snap fit prong 122 is inserted through the second aperture 154, the extension 118 is inserted between the pair of cantilever prongs 14. In embodiments having crush ribs 174, each of the crush ribs 174 is aligned with a side of each of the pair of cantilever prongs 14. The extension 118 may have an interference fit with the pair of cantilever prongs 14 to reduce vibration and rattle and to provide a counter force against the opposing vibration or creep forces.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A component retention assembly fixed to an associated part and configured to be engaged with a bracket of a component, the component retention assembly comprising:
    a pair of cantilever prongs; and
    a clip,
    wherein the clip includes a hinge and an extension removably disposed between the pair of cantilever prongs when the clip is in a closed position, and
    a prong is disposed on an end of the extension opposite the hinge, the prong including a retaining face configured to engage the bracket and retain the clip in the closed position; wherein the component retention assembly is a single, monolithic part.

2. The component retention assembly of claim 1, wherein each cantilever prong of the pair of cantilever prongs includes a ramp on a free end of the cantilever prong.

3. The component retention assembly of claim 1, wherein the prong includes a ramp on a free end of the prong.

4. The component retention assembly of claim 1, wherein the prong is triangularly shaped.

5. The component retention assembly of claim 1, wherein the clip includes a base fixed to an end of the hinge opposite the extension.

6. The component retention assembly of claim 5, wherein the clip rotates about the hinge between an open position and the closed position, the open position being about 180 degrees or greater relative to the base and the closed position being about 90 degrees relative to the base.

7. A component assembly comprising:
    a part;
    a component configured to be fixed to the part; and
    a retention assembly fixed to the part and engaging a bracket on the component to secure the component to the part, wherein the retention assembly includes a pair of cantilever prongs; and a clip,
    wherein the clip rotates about a hinge between an open position and a closed position,
    an extension on the clip is disposed between the pair of cantilever prongs when the clip is in a closed position, and
    a prong on the clip is disposed on an end of the extension opposite the hinge, the prong including a retaining face configured to engage the bracket and retain the clip in the closed position;
    wherein the retention assembly is a single, monolithic part.

8. The component assembly of claim 7, wherein each cantilever prong of the pair of cantilever prongs includes a ramp on a free end of the cantilever prong.

9. The component assembly of claim 8, wherein each cantilever prong of the pair of cantilever prongs includes a surface opposite the ramp that engages a front surface of the bracket.

10. The component assembly of claim 7, wherein the prong includes a ramp on a free end of the prong.

11. The component assembly of claim 10, wherein the prong includes a retaining surface on an opposite end of the ramp that engages a rear surface of the bracket.

12. The component assembly of claim 7, wherein the prong is triangularly shaped.

13. The component assembly of claim 7, wherein the clip includes a base fixed to an end of the hinge opposite the extension.

14. The component assembly of claim 13, wherein when the clip is in the open position, an angle between the extension and the base is about 180 degrees or greater and when the clip is in the closed position, the angle between the extension and the base is about 90 degrees.

15. The component assembly of claim 7, wherein the extension includes at least one nub extending from a top surface, a bottom surface, or the top surface and the bottom surface.

16. The component assembly of claim 15, wherein the at least one nub engages a side of one cantilever prong of the pair of cantilever prongs.

17. The component assembly of claim 7, wherein the retention assembly is formed of a polymer.

18. The component assembly of claim 7, wherein the retention assembly and the part are a single, monolithic part.

19. The component assembly of claim 7, wherein the retention assembly is injection molded.

* * * * *

UNITED STATES PATENT AND TRADEMARK OFFICE
CERTIFICATE OF CORRECTION

PATENT NO. : 10,605,281 B2
APPLICATION NO. : 16/100623
DATED : March 31, 2020
INVENTOR(S) : Justin Harris

Page 1 of 1

It is certified that error appears in the above-identified patent and that said Letters Patent is hereby corrected as shown below:

On the Title Page

Column 1, item (73) Assignee, Lines 1-2: Delete "DENSO International Business Machines Corporation," and insert --DENSO International America, Inc.,-- therefor Signed and Sealed this
Ninth Day of June, 2020

Andrei Iancu
*Director of the United States Patent and Trademark Office*